United States Patent
Rueb et al.

(10) Patent No.: US 10,480,923 B2
(45) Date of Patent: Nov. 19, 2019

(54) SENSOR APPARATUS AND ROBOT SYSTEM HAVING THE SENSOR APPARATUS

(71) Applicant: Robert Bosch GmbH, Stuttgart (DE)

(72) Inventors: Andreas Rueb, Ditzingen (DE); Lukas Becker, Dettingen/Erms (DE)

(73) Assignee: Robert Bosch GmbH, Stuttgart (DE)

( * ) Notice: Subject to any disclaimer, the term of this patent is extended or adjusted under 35 U.S.C. 154(b) by 2 days.

(21) Appl. No.: 15/764,697

(22) PCT Filed: Aug. 11, 2016

(86) PCT No.: PCT/EP2016/069141
§ 371 (c)(1),
(2) Date: Mar. 29, 2018

(87) PCT Pub. No.: WO2017/059992
PCT Pub. Date: Apr. 13, 2017

(65) Prior Publication Data
US 2018/0283842 A1    Oct. 4, 2018

(30) Foreign Application Priority Data

Oct. 7, 2015   (DE) .................. 10 2015 219 332

(51) Int. Cl.
*G01B 7/012*     (2006.01)
*B25J 13/08*     (2006.01)
(Continued)

(52) U.S. Cl.
CPC ............ *G01B 7/012* (2013.01); *B25J 13/088* (2013.01); *B25J 17/0208* (2013.01);
(Continued)

(58) Field of Classification Search
CPC ........ A61B 34/00; A47L 2201/00; B25J 3/04; B25J 9/00; B25J 9/0081; B25J 9/16;
(Continued)

(56) References Cited

U.S. PATENT DOCUMENTS 4,866,854 A * 9/1989 Seltzer .................. B23P 19/105
                                                    33/558
4,874,998 A * 10/1989 Hollis, Jr. ............... B23Q 5/28
                                                    318/568.21
(Continued)

FOREIGN PATENT DOCUMENTS

CN        86105617 A      3/1988
CN        1712882 A       12/2005
(Continued)

OTHER PUBLICATIONS

International Search Report dated Oct. 25, 2016 of the corresponding International Application PCT/EP2016/069141 filed Aug. 11, 2016.

*Primary Examiner* — Antony M Paul
(74) *Attorney, Agent, or Firm* — Norton Rose Fulbright US LLP; Gerard Messina (57) ABSTRACT

A sensor apparatus includes a main body, counter body movable relative to the main body, and a plurality of sensor devices for the output of sensor signals, the sensor devices each including at least one sensor and at least one target area. The sensors are disposed on one of the bodies, and the target areas are disposed on the other body. The sensors are developed for detecting the target areas in each case. The sensor apparatus further includes an evaluation device developed to determine from the sensor signals a relative position, in three translational degrees of freedom and in three rotational degrees of freedom, between the counter body and the main body.

17 Claims, 4 Drawing Sheets

(51) Int. Cl.
*B25J 17/02* (2006.01)
*B25J 19/02* (2006.01)
*G01B 7/00* (2006.01)

(52) U.S. Cl.
CPC ....... *B25J 17/0225* (2013.01); *B25J 17/0233* (2013.01); *B25J 19/027* (2013.01); *G01B 7/003* (2013.01)

(58) Field of Classification Search
CPC .......... B25J 13/00; B25J 19/02; B25J 13/088; G05B 2219/39; G05D 1/00; Y10S 901/00
USPC ..................... 901/33, 41, 46, 31, 32, 36, 38; 318/568.11, 568.12, 568.2, 568.16, 318/400.37, 400.38; 700/245
See application file for complete search history.

(56) References Cited

U.S. PATENT DOCUMENTS

| | | | |
|---|---|---|---|
| 5,929,846 A | 7/1999 | Rosenberg et al. | |
| 7,366,585 B2* | 4/2008 | Schnoor | B25J 9/1638 414/735 |
| 8,862,269 B2* | 10/2014 | Martinez | B25J 9/1687 200/245 |
| 9,079,308 B2* | 7/2015 | Martinez | B25J 9/1687 |
| 9,126,336 B2* | 9/2015 | Eakins | B25J 9/1687 |
| 9,605,952 B2* | 3/2017 | Rose | G01L 1/16 |
| 9,649,174 B2* | 5/2017 | Swarup | A61B 34/37 |
| 10,065,309 B2* | 9/2018 | Rose | G01L 1/16 |
| 2013/0090763 A1* | 4/2013 | Simaan | A61B 5/11 700/258 |
| 2014/0167745 A1 | 6/2014 | Held et al. | |
| 2015/0025761 A1 | 1/2015 | Kernebeck | |
| 2015/0045953 A1 | 2/2015 | Nagai et al. | |

FOREIGN PATENT DOCUMENTS

| | | |
|---|---|---|
| CN | 201754179 U | 3/2011 |
| CN | 102155902 A | 8/2011 |
| DE | 102010034482 A1 | 4/2012 |
| EP | 2442113 A1 | 4/2012 |
| JP | H04253 A | 1/1992 |

* cited by examiner

SENSOR APPARATUS AND ROBOT SYSTEM HAVING THE SENSOR APPARATUS

CROSS-REFERENCE TO RELATED APPLICATIONS

The present application is the national stage of International Pat. App. No. PCT/EP2016/069141 filed Aug. 11, 2016, and claims priority under 35 U.S.C. § 119 to DE 10 2015 219 332.2, filed in the Federal Republic of Germany on Oct. 7, 2015, the content of each of which are incorporated herein by reference in their entireties.

FIELD OF THE INVENTION

The present invention relates to a sensor apparatus that includes a main body; a counter body arranged so as to allow a relative movement with respect to the main body; a plurality of sensor devices for the output of sensor signals, the sensor devices including at least one sensor and at least one target area in each case, and the sensor being disposed on one of the bodies and the target area being disposed on the other body, and the sensor being developed to detect the target area; and an evaluation device designed to determine a relative position between the counter body and the main body from the sensor signals. In addition, the present invention relates to a robot system having the tactile sensor apparatus.

BACKGROUND

Automated handling devices often use sensors for detecting measured quantities and for optionally recording them, or for controlling the handling device within the scope of an open-loop or closed-loop control. Sensors that record the measured quantities through bodily contact are also known as tactile sensors. For example, such tactile sensors are used in coordinate-measuring machines, but it is also known to use tactile sensors for the detection of components or component geometries. In the simplest form, tactile sensors of this type have a switch whose switching state changes when contact is made between the tactile sensor and a measured body in order to thereby detect the measured body. Other tactile sensors are able to detect a deflection of a tactile element, for instance.

For example, the printed publication DE 10 2006 252 A1, which appears to constitute the most proximate related art, describes an apparatus for guiding an energy beam, in particular a laser beam. The apparatus uses a tactile sensor to detect the position of a fillet weld to be soldered. A closed-loop control system controls an actuator for the laser beam as a function of the detected position of the fillet weld relative to the tactile element so that the point of action of the laser beam lies at a desired position on the fillet weld.

SUMMARY

According to an example embodiments of the present invention, a sensor apparatus includes a main body and a counter body. The counter body is disposed in such a way that it is able to move relative to the main body. Preferably, the counter body is directly connected to the main body. As an alternative, the counter body can also be connected to the main body via an intermediate construction. The counter body is deflectable relative to the main body, for instance when a force is acting on the counter body. In a tactile robot application, for example, such a force is able to be transmitted to the counter body through contact with a measured object.

The sensor apparatus includes a plurality of sensor devices, which are developed for the output of sensor signals. The sensor signals can be realized as analog or as digital signals. The sensor devices include at least one sensor and at least one target area in each case. The sensor is developed to detect a respectively allocated target area, in particular in a contact-free manner. The main body and the counter body are referred to as bodies. The sensor is situated on one of the bodies, and the target area is situated on the other body. For example, the sensor can be disposed on the counter body and the target area can be on the main body. However, for wiring-related reasons, among others, or in general, it is preferred if the sensor, and in particular a few sensors, and specifically all sensors, is/are disposed on the main body and that the target area, in particular a few target areas, and specifically all target areas is/are disposed on the counter body. Preferably, the target area, in particular a few target areas, and specifically all target areas is/are developed as passive target areas.

In addition, the sensor apparatus includes an evaluation device, and the evaluation device is preferably developed in the form of a digital data-processing device. More specifically, the evaluation device is designed, especially in terms of programming and/or circuit technology, to determine a relative position between the counter body and the main body.

Within the framework of the present invention, it is proposed that the evaluation device be designed to determine the relative position in three translational and three rotational degrees of freedom. The translational degrees of freedom preferably lie in a Cartesian arrangement relative to one another. In particular, the sensor apparatus is developed in the form of a 6D (six-dimensional) sensor apparatus, and the evaluation device, in particular, is developed to determine and/or output coordinates with regard to the six degrees of freedom.

In contrast to the known sensors, the present invention offers the advantage that the sensor apparatus according to the present invention can determine all of the dimensions of the counter body relative to the main body that are required in order to be fully aware of the position of the counter body relative to the main body.

Especially preferably, the sensor apparatus is developed in the form of a tactile sensor apparatus and is suitable and/or developed for a robot system. A tactile sensor apparatus preferably means a sensor apparatus which makes physical contact with the measured object in order to detect a/the measured object. The robot system especially includes a robot and a tool. A robot preferably describes any type of handling device that allows for a manipulation of the tool. For example, the robot can be designed as a Cartesian robot, as an articulated robot, a pick-and-place robot, etc. In the simplest form, the robot can also be developed as a linear axle or as a pivot axle.

The tactile sensor apparatus includes the main body, which is able to be connected, or is connected, to the robot. In particular, the main body has an interface for the connection to the robot. Especially preferably, the main body is rigidly connected to the robot, in particular to a robot hand of the robot.

In addition, the tactile sensor apparatus includes the counter body, which is developed as a tactile body and is able to be connected to the tool. More specifically, the tactile body includes an interface for the connection to the tool. Especially preferably, the tactile body is connected to the tool in a rigid manner.

In one possible constructive development of the present invention, the counter body and the main body each includes a plate section. The plate sections preferably face each other. The plate sections are situated so as to be tiltable, rotatable, and shiftable in relation to each other. This allows for a relative movement of the counter body and the main body with respect to each other within the scope of the three translational and the three rotational degrees of freedom.

It is especially preferred that the counter body is placed in preloaded form relative to the main body so that it automatically places itself in an initial position relative to the main body. For example, the sensor apparatus includes a spring device for returning the counter body to the initial position. In particular, it is provided that the counter body automatically returns to the initial position when no forces are applied to the counter body, such as by a measured object. This further refinement ensures that the position of the counter body relative to the main body is known in a control unit, in particular in the robot system, as long as the counter body has not yet made contact with the measured object.

In an example embodiment, the evaluation device determines the degrees of freedom via a calibration. For example, it is possible to teach the counter body sensor apparatus through a multitude of data points. As an alternative, it is possible to store a table or some other data collection of data points. In both cases, it is possible, for example, to determine the degrees of freedom, in particular the coordinates of the degrees of freedom, via interpolations on the basis of the available data.

In an alternative example embodiment of the present invention, the three translational and the three rotational degrees of freedom are determined using an analytical and/or numerical calculation. In the analytical calculation, the sensor apparatus is modeled so that the translational and rotational degrees of freedom are able to be calculated as a function of the sensor signals.

In a preferred example embodiment of the present invention, each target area is developed as a planar reference area, in particular on the tactile body. The reference areas define respective planes via their surface areas. The planes have a mutually independent alignment and it applies to all planes in particular that one of the planes intersects with one of the other planes only in one line. All possible lines are preferably independent of one another.

A sensor, which is developed as a distance sensor in each case, is allocated to each reference area. In this preferred example embodiment of the present invention, the six degrees of freedom are determined with the aid of six independent sensors so that the sensor apparatus in this particular development is able to be able to fully determine the position of the counter body relative to the main body.

The sensor is preferably developed as an inductive sensor. Preferably, the tactile body is at least regionally or even completely made of metal, and the reference areas can be realized as areas of the metallically developed tactile body. In alternative developments of the present invention, however, the sensors can also be developed as optical sensors, capacitive sensors, and others.

Especially preferably, the measuring principle is a contact-free measuring principle.

It is particularly preferred that in a reference position between the main body and the counter body, a measuring direction of the sensors runs at a right angle to the allocated reference area. This development simplifies the analytical and/or numerical calculation of the degrees of freedom. From the point of construction, it is preferred that the reference position corresponds to the previously described initial position.

In an example embodiment of the present invention, two reference areas are combined into a prism roof in each case and the prism roofs have a respective roof line. The roof lines are preferably set apart from one another at regular intervals on a circle around a stack direction of the main body and the counter body, and/or they assume an intermediate angle of 120 degrees. This corresponds to a preferred and/or exemplary configuration. The roof lines in particular lie in a common plane and preferably intersect in a common point. This development, too, simplifies the analytical and/or numerical calculation of the degrees of freedom.

In an alternative example embodiment of the present invention, the target areas are developed as magnet areas. Each magnet area is preferably developed as a magnet, in particular a neodymium magnet. The sensor is developed as a magnetic-field sensor in each case. A realization of the magnetic-field sensor as a Hall-effect sensor is especially preferred. In one preferred further example embodiment of the present invention, the magnetic-field sensors are developed as three-dimensional magnetic-field sensors, which are able to measure a magnetic field in all three directions in space. The magnetic-field sensors are particularly designed to ascertain both the strength and the direction of a magnetic field.

In a preferred example embodiment of the present invention, a first sensor device includes three magnetic-field sensors, in particular three three-dimensional magnetic-field sensors. In addition, the first sensor device has a first magnet, in particular a neodymium magnet, as the magnet area, which is detected by the three magnetic-field sensors. For example, the magnetic-field sensors are placed in the form of a triangle, in particular an equilateral triangle, with respect to one another. A plane that is defined by the triangle preferably runs parallel to the plane that is defined by the roof lines when the sensor device is in the initial situation and/or in the reference position. In the initial situation and/or in a reference position, it is preferred that the magnet area is situated between, and in particular centrally with respect to, the three magnetic-field sensors and/or in the center point of the triangle in a projection in the stack direction.

In this example embodiment, the sensor apparatus furthermore includes a second sensor device, which includes as the magnet area at least one magnetic-field sensor, especially at least one three-dimensional magnetic-field sensor, as well as a second magnet area, in particular a second magnet, and especially a second neodymium magnet. The first and the second magnet are set apart from each other.

The first sensor device makes it possible, for instance with the aid of cross bearing, to detect the position of the first magnet, and thus the position of the tactile body. However, when using the first sensor device, it is not possible to determine all six degrees of freedom. In particular, a rotational degree of freedom about a line that stands at a right angle to said triangle and runs through the first sensor device, remains undetermined in the detection. The second sensor device is provided to determine this last degree of freedom, the second sensor detecting this rotational degree of freedom in that the second sensor device is positioned at a distance from the first sensor device.

It is optionally possible that the second sensor device includes two or three magnetic-field sensors. This development results in a redundant measurement, which can lead to greater accuracy of the relative position between the main body and the counter body.

According to an example embodiment of the present invention, a robot system includes a robot, a tool guided by the robot, and a tactile sensor apparatus, e.g., as described above, which is situated, in particular in series, between the robot and the tool. More specifically, the main body and the counter body, in particular the tactile body, are disposed in series between the robot and the tool.

In an example embodiment of the present invention, the tool is a probe tip. In another example embodiment of the present invention, the tool is a gripper. The gripper is rigidly connected to the tactile body so that in case of a positional change of the gripper relative to the main body because of the gripping of a measured object, the deviation is able to be detected with the aid of the tactile sensor apparatus and can be further processed via a/the control unit of the robot system.

Further features, advantages and effects of the present invention result from the following description of a preferred exemplary embodiment of the present invention and from the appended figures.

DETAILED DESCRIPTION

Figure 1:
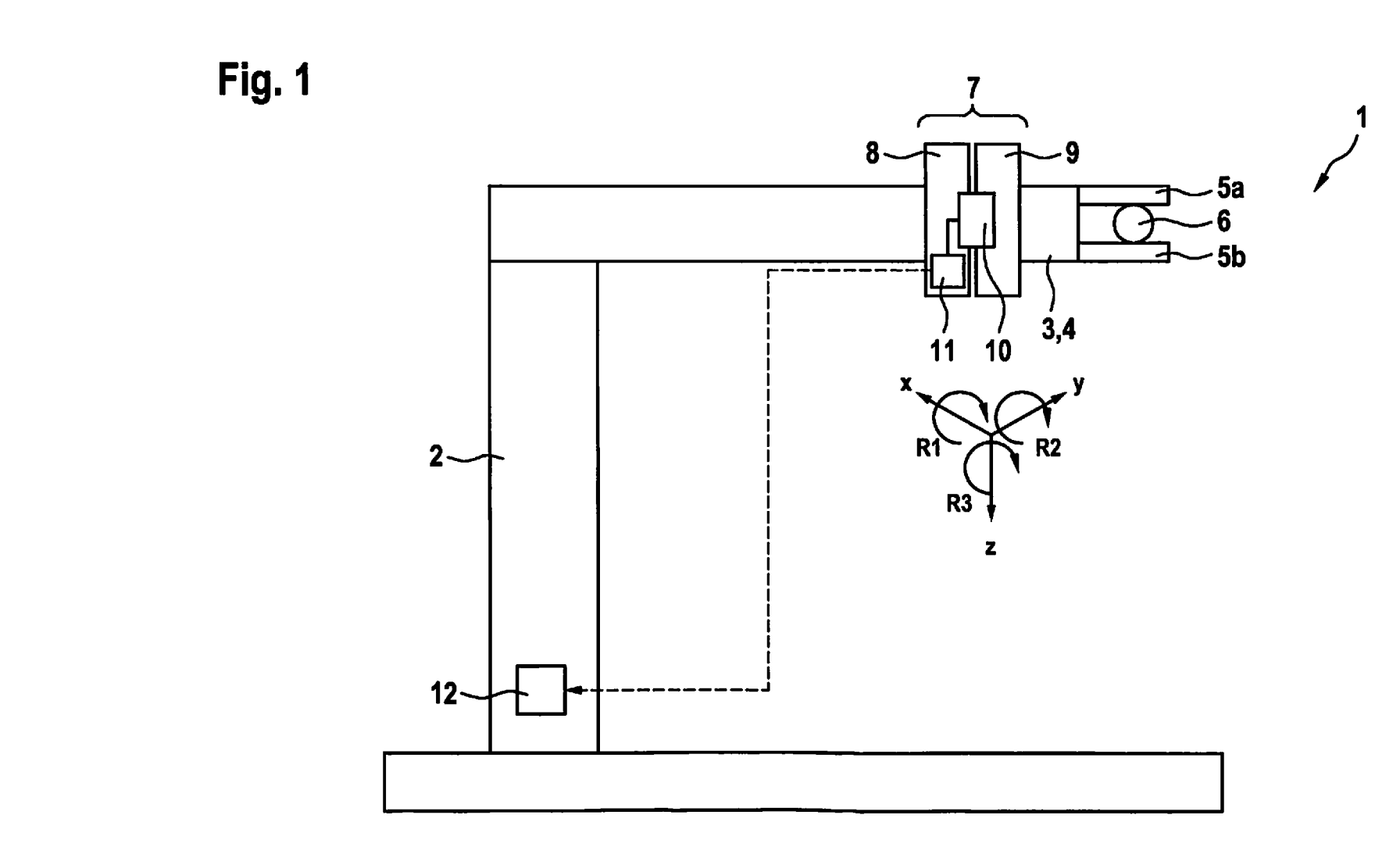
FIG. 1 is a schematic block diagram of a robot system having a tactile sensor apparatus, according to an example embodiment of the present invention.

FIG. 1 shows a robot system 1 as an exemplary embodiment of the present invention in a schematic representation. Robot system 1 has a robot 2, which is developed as a Cartesian robot in the exemplary embodiment shown. As an alternative, robot 2 can also be an articulated robot or be developed as some other handling device.

Robot 2 manipulates a tool 3, which is developed as a gripper 4 in the illustrated exemplary embodiment, which holds a measured object 6 between two grip jaws 5a, b. For example, robot system 1 can be developed to pick up a measured object 6 from a larger quantity of similar objects with the aid of tool 3, in particular with the aid of gripper 4. An tactile sensor apparatus 7, in particular a tactile sensor apparatus 7, is situated between robot 2 and tool 3. Tool 3 thus is carried by robot 2 via tactile sensor apparatus 7. Robot 2, tactile sensor apparatus 7, and tool 3 form a serial kinematic chain, in particular.

Tactile sensor apparatus 7 has a main body 8 as well as a tactile body 9 as a counter body. Main body 8 is fixedly connected to robot 2, in particular to a last axle of robot 2. Tactile body 9, on the other hand, is fixedly connected to tool 3, in particular to gripper 4.

Main body 8 and tactile body 9 are situated in a self-supporting manner relative to each other, but tactile body 9 is able to be tilted, rotated, and shifted in relation to main body 8. For example, tactile body 9 is disposed with preloading relative to main body 8 so that it automatically moves itself into an initial position with respect to main body 8. For example, if a force is applied to tool 3, e.g., while measured object 6 is gripped, because tool 3, in particular gripper 4, is unable to accurately pick up measured object 6, in particular not without applying a force, then tool 3 transmits this force to tactile body 9, which, together with tool 3, is changed in its position relative to main body 8 and robot 2.

Tactile sensor apparatus 7 includes a plurality of sensor devices 10, which shall still be described in the appended figures. In the following exemplary embodiments in FIGS. 2a-2c and 3a-3b, each sensor device 10 is provided with at least one sensor 13 and at least one target area 14. In the exemplary embodiments shown, sensor 13 is situated on main body 8 and target area 14 is situated on tactile body 9 in each case. Sensor 13 is developed to detect allocated target area 14. In particular, target area 14 is developed as a passive region. Sensors 13 and/or sensor devices 10 generate sensor signals, which are forwarded to an evaluation device 11. Evaluation device 11, for example, is developed as a microprocessor or as some other digital or analog data-processing device. Evaluation device 11 is developed to determine a relative position between tactile body 9 and main body 8 on the basis of the sensor signals from sensor devices 10. In the process, evaluation device 11 determines the relative position in three translational degrees of freedom, X, Y, Z, and in three rotational degrees of freedom, R1, R2, R3. Rotational degrees of freedom, R1, R2, R3, in particular are developed as rotational angles about translational degrees of freedom X, Y, Z. Translational degrees of freedom X, Y, Z in particular define a Cartesian coordinate system. Evaluation device 11 therefore determines a coordinate on an X-axis and also a rotation R1 about this X-axis, a coordinate on a Y-axis and also a rotation R2 about this Y-axis, and a coordinate on the Z-axis and also a rotation R3 about this Z-axis.

The relative position between tactile body 9 and main body 8 is fully detected by determining the three translational degrees of freedom X, Y, Z and the three rotational degrees of freedom R1, R2, R3. It can optionally be provided to forward the relative position to a control unit 12 of robot system 1, which uses the relative position as an actual quantity in a control circuit, in particular a closed loop or an open loop control. As an alternative or in addition, the relative position can be recorded.

Figure 2A:
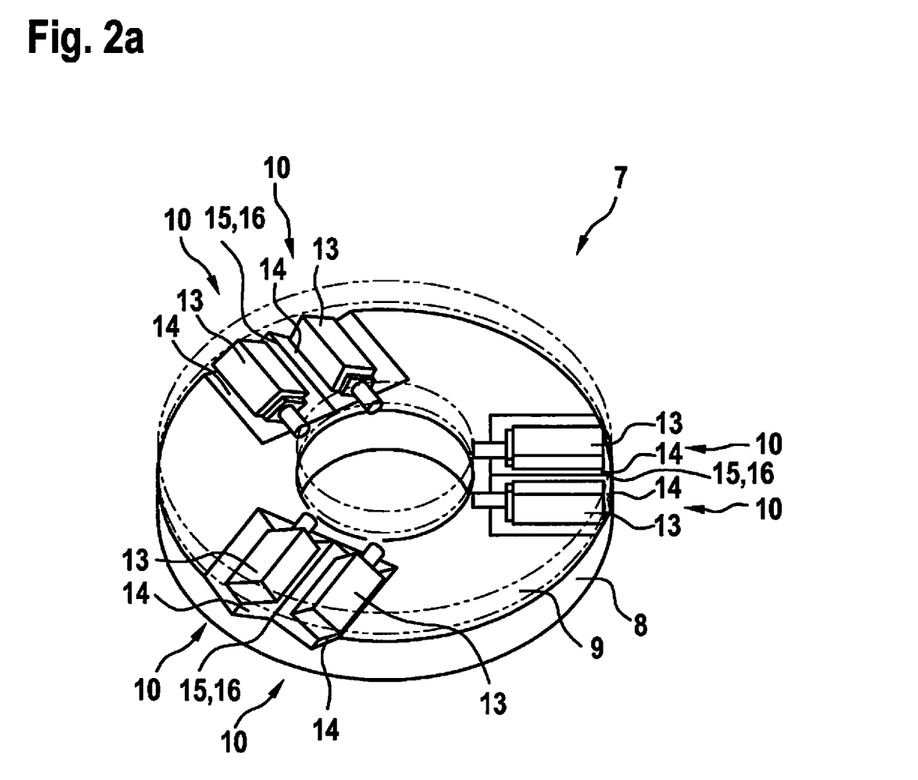
FIGS. 2a-2c are a schematic three-dimensional representation, a side view, and a plan view of a tactile sensor apparatus, according to a first example embodiment of the present invention.
Figure 2B:
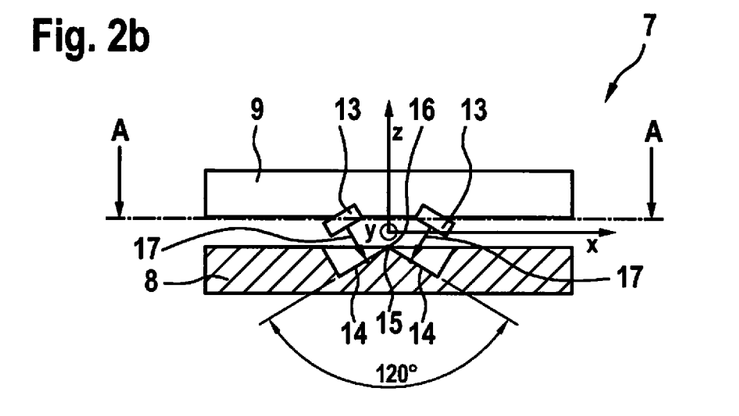
Figure 2C:
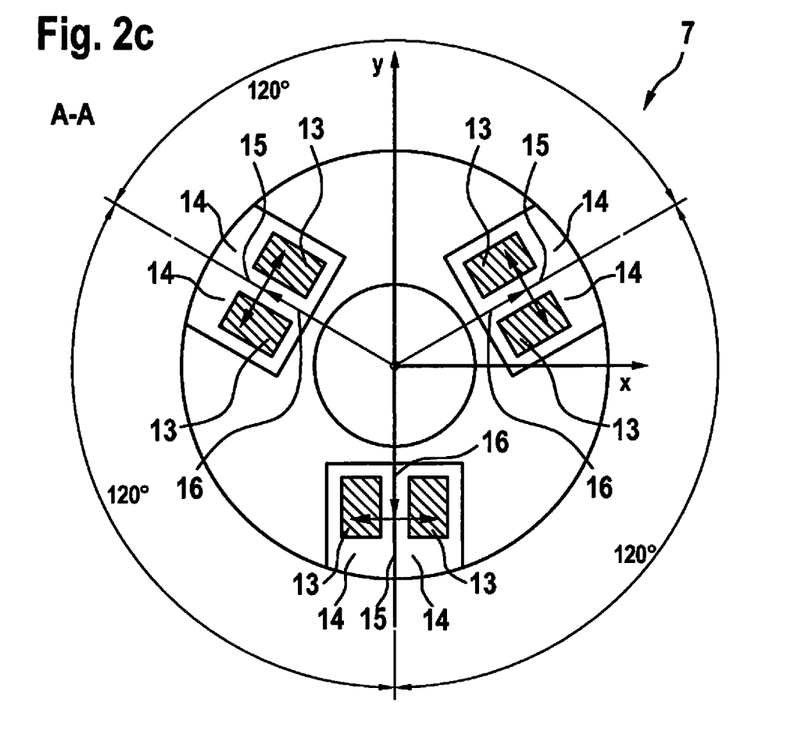

FIGS. 2a-2c show a first example embodiment of a tactile sensor apparatus 7, FIG. 2a showing a schematized, three-dimensional representation, FIG. 2b showing a side view, and FIG. 2c showing a plan view from above in a stack direction of main body 8 and tactile body 9. It becomes clear from FIG. 2a, in particular, that main body 8 and tactile body 9 are developed as individual plate sections, which are disposed parallel to each other in an/the initial position.

Tactile sensor apparatus 7 includes six sensor devices 10, and each sensor device 10 includes a sensor 13 as well as a target area 14 that is allocated to this sensor 13. Sensors 13 are developed as inductive distance sensors in each case. Target area 8 is developed as a planar and/or level reference area on tactile body 9. More specifically, tactile body 9 is developed as a metal part so that inductive sensor 13 is able to detect a distance from target area 14. Sensor devices 10 and/or target areas 14 are disposed in pairs relative to each other, and target areas 14 form a prism 15 in each pair. Prism 15 defines a roof line 16, and roof lines 16 of the three pairs meet in a common center point. Prisms 15 are disposed at an offset, e.g., at a 120 degree offset, about the stack direction in the peripheral direction. Through the constructive selection of target areas 14, as they have been previously described, target areas 14 define six planes that are independent of one another. In particular, it holds true for each plane that it intersects with any other plane only in one line. In this way, the six sensors 13 measure in six directions that are independent of one another.

FIG. 2b shows a side view of tactile sensor apparatus 7. Once again, it can be seen that target areas 14 are disposed as lateral sides of prism 15. Prism 15 assumes a roof angle of 120 degrees. Alternatively, it is also possible to choose a roof angle of 120 degrees. Sensors 13 have a measuring direction 17 in each case, which is aligned at a right angle to target areas 13 in the initial position of the tactile sensor apparatus.

FIG. 2c depicts a schematized plan view of the tactile sensor apparatus, which once again shows the geometrical relationships in the described manner.

Evaluation device 11 is able to convert the sensor signals from sensors 13 into the relative position featuring the six degrees of freedom in terms of programming and/or circuitry technology, for instance in that calibration information is stored in evaluation device 11. However, it is also possible to represent the constructive development in a mathematical model so that it is possible to analytically or numerically calculate the relative position with the six degrees of freedom on the basis of the sensor signals from sensors 13.

Figure 3A:
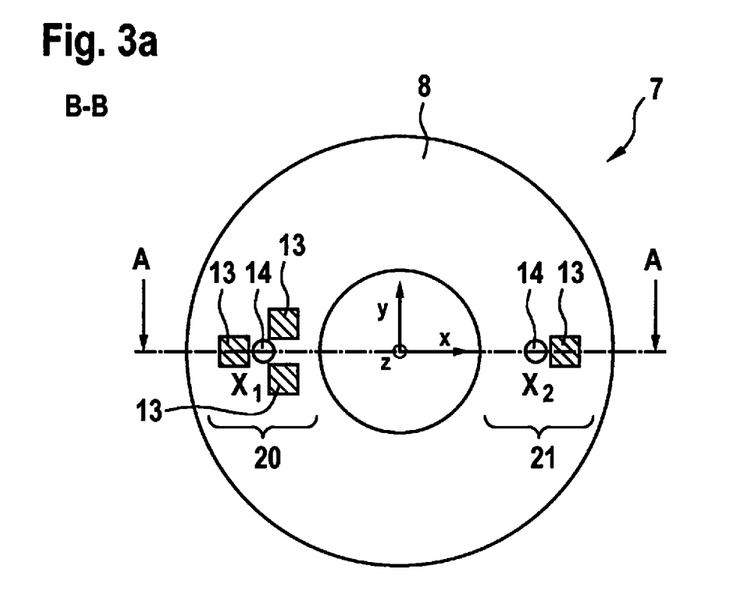
FIGS. 3a-3b are schematic plan view and a schematic side view of a tactile sensor apparatus, according to another example embodiment of the present invention.
Figure 3B:
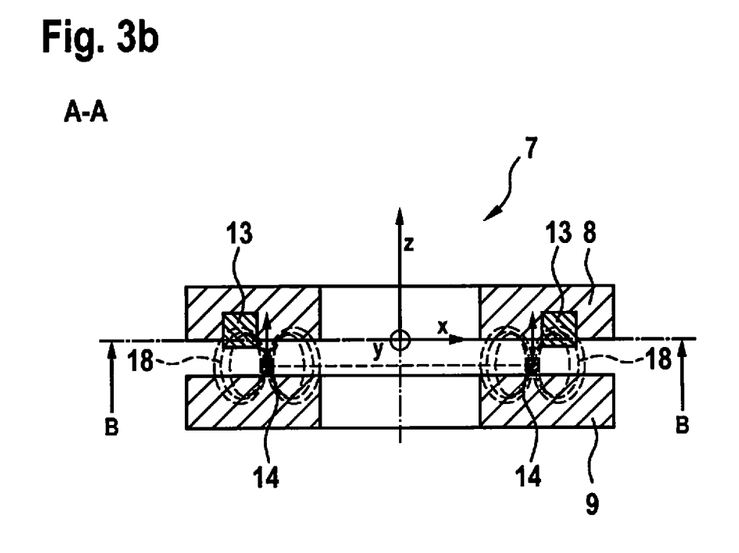

A plan view and a side view of a tactile sensor apparatus 7 are shown in FIGS. 3a-3b as a second exemplary embodiment of the present invention. In the second exemplary embodiment of the present invention, tactile sensor apparatus 7 has two sensor devices. A first sensor device 20 has three sensors 13 and a target area 14, and second sensor device 21 has one sensor 13 and one target area 14. First sensor device 20 and second sensor device 21 are situated at a distance from each other. This not only increases the measuring accuracy but also ensures that target areas 14 do not interfere with one another.

Sensors 13 are each developed as three-dimensional magnetic-field sensors, in particular three-dimensional Hall-effect sensors, in the first and the second sensor device 20, 21. Target areas 14 are developed in the form of magnets, in this particular example as neodymium magnets. The three sensors 13 of first sensor device 20 are disposed in the form of a triangle. In the plan view illustrated from above, target area 14 is positioned between sensors 13 in the initial position of tactile sensor apparatus 7. Sensors 13 are fixedly connected to main body 8, and target area 14 is fixedly connected to tactile body 9. The position of target area 14, which is developed as the neodymium magnet, is able to be detected via the placement of the three sensors 13. However, when using the illustrated system, it is not possible to detect a pivot or a rotation of tactile body 9 relative to main body 8 about a line that is oriented parallel to the stack direction and runs through target area 14. For this reason, second sensor device 21 is assigned the task of detecting this relative movement, which can also be referred to as a rolling motion. In the illustrated exemplary embodiment, a sensor 13 of first sensor device 20 and sensor 13 of second sensor device 21 lie on a shared line, and the other two sensors 13 of first sensor device 20 are distributed along both sides of the line. FIG. 3b shows a schematized side view, which depicts magnetic fields 18 of target areas 14.

What is claimed is:

1. A sensor system comprising:
   a main body;
   a counter body that is movable relative to the main body;
   a plurality of sensor devices, wherein, with respect to each of the plurality of sensor devices, the respective sensor device includes a respective target area on one of the main and counter bodies and a respective sensor, that is configured to detect the target area, on the other of the main and counter bodies; and
   a processor configured to determine a relative position, with respect to three translational directions and three rotational degrees of freedom, between the counter body and the main body from sensor signals output by the sensor devices.

2. The sensor system of claim 1, wherein the main body is connectable to a robot, and the counter body is a tactile body that is connectable to a tool.

3. The sensor system of claim 1, wherein the counter body and the main body each includes a plate section, and the plate sections are tiltable, rotatable, and shiftable relative to each other.

4. The sensor system of claim 1, wherein the counter body is disposed in preloaded form relative to the main body so that the counter body automatically places itself in an initial position relative to the main body.

5. The sensor system of claim 1, wherein the processor is configured to determine the degrees of freedom via a calibration or via an analytical or numerical calculation.

6. The sensor system of claim 1, wherein:
   the sensors are distance sensors;
   the target areas are planar reference areas that each defines a respective plane that is allocated a respective one of the sensors; and
   for each pair of any two of the target areas, the respective planes of the target areas of the pair intersect each only in one line.

7. The sensor system of claim 6, wherein in a reference position between the main body and the counter body, a measuring direction of each of the sensors is perpendicular to the respective reference area plane allocated to the respective sensor.

8. The sensor system of claim 1, wherein the target areas are magnet areas, and the sensors are magnetic-field sensors.

9. The sensor system of claim 8, wherein the magnetic-field sensors are three-dimensional magnetic-field sensors.

10. The sensor system of claim 8, wherein a first one of the sensor devices includes three of the magnetic-field sensors and one of the target areas, which is a first magnet, and a second one of the sensor devices includes only one of the magnetic-field sensors and one of the target areas, which is a second magnet.

11. The sensor system of claim 10, wherein the first and the second magnets are set apart from each other.

12. The sensor system of claim 8, wherein a first one of the sensor devices includes three of the magnetic-field sensors and one of the target areas, which is a first magnet, and a second one of the sensor devices includes only two of the magnetic-field sensors and one of the target areas, which is a second magnet.

13. The sensor system of claim 8, wherein a first one of the sensor devices includes three of the magnetic-field sensors and one of the target areas, which is a first magnet, and a second one of the sensor devices includes three of the magnetic-field sensors and one of the target areas, which is a second magnet.

14. The sensor system of claim 1, wherein the sensors are configured to detect the respective target areas in a contact-free manner.

15. A robot system comprising:
a robot;
a tool guidable by the robot; and
a sensor system between the robot and the tool, wherein:
the sensor system includes:
a main body;
a counter body that is movable relative to the main body;
a plurality of sensor devices; and
a processor configured to determine a relative position, with respect to three translational directions and three rotational degrees of freedom, between the counter body and the main body from sensor signals output by the sensor devices; and
with respect to each of the plurality of sensor devices, the respective sensor device includes a respective target area on one of the main and counter bodies and a respective sensor, that is configured to detect the target area, on the other of the main and counter bodies.

16. The robot system of claim 15, wherein the tool is a probe tip.

17. The robot system of claim 15, wherein the tool is a gripper.

* * * * *